US012322318B2

(12) United States Patent
Hu

(10) Patent No.: US 12,322,318 B2
(45) Date of Patent: Jun. 3, 2025

(54) DISPLAY PANEL AND ELECTRONIC TERMINAL COMPISING STOROBE MODULE CONNECTING INPUT TERMINALS TO OUTPUT TERMINALS

(71) Applicant: WUHAN CHINA STAR OPTOELECTRONICS TECHNOLOGY CO., LTD., Hubei (CN)

(72) Inventor: Zemin Hu, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 17/904,655

(22) PCT Filed: Aug. 8, 2022

(86) PCT No.: PCT/CN2022/110806
§ 371 (c)(1),
(2) Date: Aug. 19, 2022

(87) PCT Pub. No.: WO2024/011686
PCT Pub. Date: Jan. 18, 2024

(65) Prior Publication Data

US 2024/0194112 A1 Jun. 13, 2024

(30) Foreign Application Priority Data

Jul. 12, 2022 (CN) ......................... 202210816633.4

(51) Int. Cl.
*G09G 3/20* (2006.01)

(52) U.S. Cl.
CPC ... *G09G 3/2092* (2013.01); *G09G 2310/0275* (2013.01)

(58) Field of Classification Search
None
See application file for complete search history.

(56) References Cited

U.S. PATENT DOCUMENTS

2004/0252689 A1 12/2004 Park et al.
2006/0244710 A1 11/2006 Iriguchi et al.
(Continued)

FOREIGN PATENT DOCUMENTS

CN 102298893 A 12/2011
CN 104122685 A 10/2014
(Continued)

OTHER PUBLICATIONS

International Search Report in International application No. PCT/CN2022/110806, mailed on Dec. 22, 2022.
(Continued)

*Primary Examiner* — Benjamin C Lee
*Assistant Examiner* — Nathan P Brittingham

(57) ABSTRACT

The present application provides a display panel and an electronic terminal, including an insulation substrate, and a plurality of data lines disposed on the insulation substrate and electrically connected to a source driving circuit, where the source driving circuit includes a first module, a second module, and a strobe module connected between the first module and the second module, which are all disposed on the insulation substrate, and the strobe module is configured to control output pins of the first module to be electrically connected to different input pins of the second module at different moments.

19 Claims, 11 Drawing Sheets

(56) References Cited

U.S. PATENT DOCUMENTS

| | | | | |
|---|---|---|---|---|
| 2007/0164961 | A1* | 7/2007 | Koyama | G09G 3/3266 345/92 |
| 2007/0279402 | A1* | 12/2007 | Inada | G09G 3/2059 345/204 |
| 2018/0138256 | A1 | 5/2018 | Han et al. | |
| 2020/0090594 | A1* | 3/2020 | Zou | G09G 3/3225 |
| 2022/0189431 | A1* | 6/2022 | Lim | G09G 3/3677 |
| 2022/0223111 | A1* | 7/2022 | Wang | G09G 3/3266 |
| 2022/0293037 | A1* | 9/2022 | Zheng | G09G 3/32 |

FOREIGN PATENT DOCUMENTS

| | | | |
|---|---|---|---|
| CN | 107146586 | A | 9/2017 |
| CN | 110221461 | A | 9/2019 |
| CN | 110910834 | A | 3/2020 |
| CN | 111445824 | A | 7/2020 |

OTHER PUBLICATIONS

Written Opinion of the International Search Authority in International application No. PCT/CN2022/110806, mailed on Dec. 22, 2022.

Chinese Office Action issued in corresponding Chinese Patent Application No. 202210816633.4 dated Dec. 11, 2024, pp. 1-9.

* cited by examiner

DISPLAY PANEL AND ELECTRONIC TERMINAL COMPISING STOROBE MODULE CONNECTING INPUT TERMINALS TO OUTPUT TERMINALS

TECHNICAL FIELD

The present disclosure relates to the field of display technologies, in particular to the field of display panel manufacturing technologies, and specifically, to a display panel and an electronic terminal.

BACKGROUND

A display panel can process electrical signals for display of a picture so as to convey information, and has become an essential part of life and work.

Currently, a driving circuit in the display panel includes a plurality of functional parts. A device size in the functional parts cannot be sufficiently small due to limitation of a process capability of the driving circuit. The number of devices in a portion of the functional parts is relatively larger, so that an occupied area of the portion of the functional parts and an occupied area of the driving circuit as a whole are relatively larger, thereby increasing the cost of a substrate for carrying the driving circuit.

Therefore, the larger occupied area of the driving circuit in the conventional display panel has a problem in which the cost of the carrier substrate is increased, and needs to be improved.

Technical Problems

Embodiments of the present application provides a display panel and an electronic terminal, so as to solve the technical problem of increasing the cost of the carrier substrate due to the larger occupied area of the driving circuit in the conventional display panel.

Technical Solutions to the Problem

An embodiment of the present application provides a display panel comprising:

- an insulation substrate;
- a plurality of data lines disposed on the insulation substrate; and
- a source driving circuit electrically connected to the plurality of data lines and comprising both a first module and a second module disposed on the insulation substrate;
- wherein the source driving circuit further comprises a strobe module disposed on the insulation substrate and connected between a plurality of output pins of the first module and a plurality of input pins of the second module, the number of the output pins of the first module is different from the number of the input pins of the second module, and the strobe module is configured to control the output pins of the first module to be electrically connected to different input pins of the second module at different moments.

Another embodiment of the present application provides an electronic terminal comprising the display panel according to any one of the foregoing.

Beneficial Effects

The display panel and the electronic terminal provided in the embodiments of the present application include: the insulation substrate; the plurality of data lines disposed on the insulation substrate; and the source driving circuit electrically connected to the plurality of data lines and including both the first module and the second module disposed on the insulation substrate; wherein the source driving circuit further includes the strobe module disposed on the insulation substrate and connected between the plurality of output pins of the first module and the plurality of input pins of the second module, the number of the output pins of the first module is different from the number of the input pins of the second module, and the strobe module is configured to control the output pins of the first module to be electrically connected to different input pins of the second module at different moments. On the one hand, at least the first module and the second module in the source driving circuit of the present application are disposed on the insulation substrate to reduce the size of a carrier module or device including but not limited to a chip. On the other hand, the strode module in the present application is connected between the first module and the second module to control the output pins of the first module to be electrically connected to different input pins of the second module at different moments, so that the number of the output pins of the first module is different from the number of the input pins of the second module, so as to reduce the size of at least one of the first module and the second module. Both of foregoing can reduce the cost of the display panel.

BRIEF DESCRIPTION OF THE DRAWINGS

Technical solutions and other beneficial effects of the present application are apparent below from detailed description of the embodiments of the present application in combination with the accompanying drawings.

EMBODIMENTS OF THE PRESENT DISCLOSURE

Figure 1:
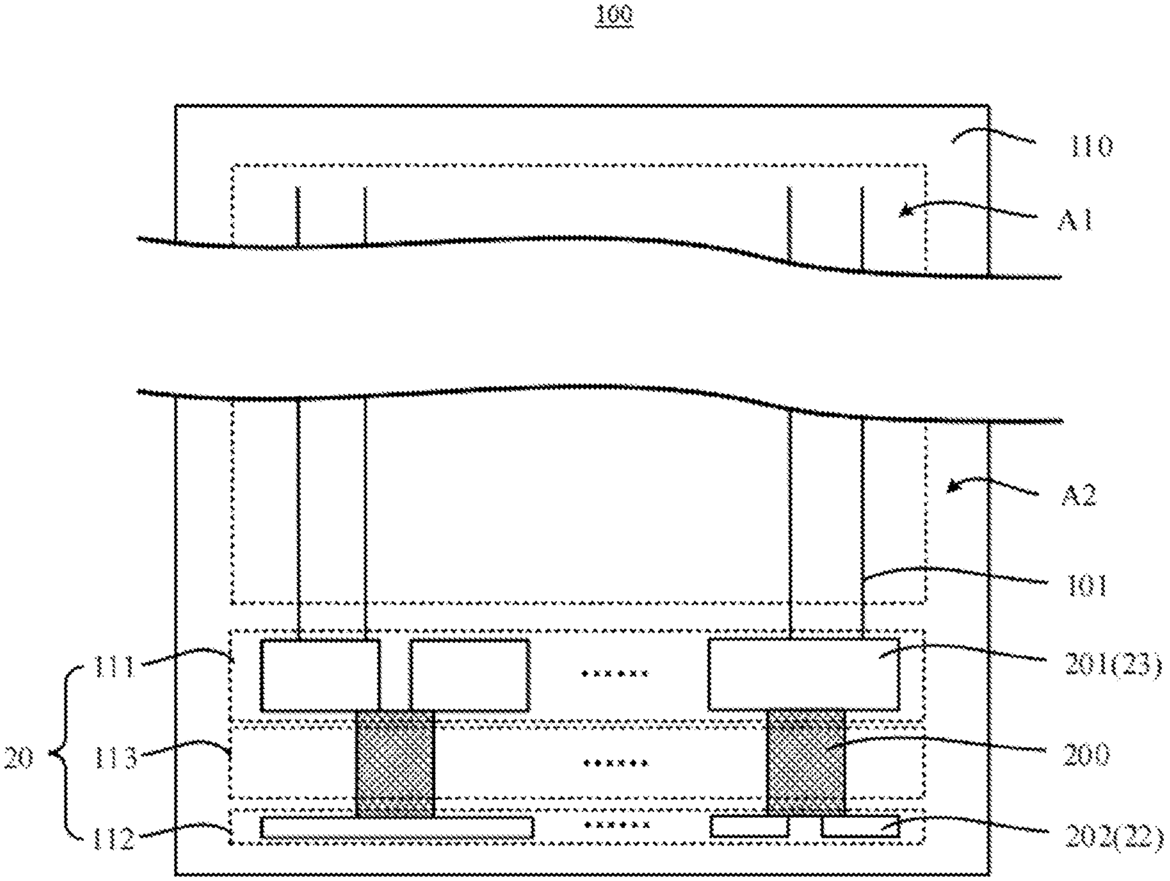
FIG. 1 is a schematic top view of a display panel according to an embodiment of the present application.

Technical solutions in embodiments of the present application will be clearly and continuously described below in conjunction with drawings in the embodiments of the present application. Obviously, the described embodiments are only a part of embodiments of the present disclosure, rather than all the embodiments. Based on the embodiments in the present application, all other embodiments obtained by those skilled in the art without creative work fall within the protection scope of the present application.

In the description of the present application, it should be understood that orientations or position relationships indicated by the terms "between", "connection", and "lateral" are based on orientations or position relationships illustrated in the drawings. The terms are used to facilitate and simplify the description of the present application, rather than indicate or imply that the devices or elements referred to herein are required to have specific orientations or be constructed or operate in the specific orientations. Accordingly, the terms should not be construed as limiting the present application. In addition, the term "first", "second", etc. are for illustrative purposes only and are not to be construed as indicating or imposing a relative importance or implicitly indicating the number of technical features indicated. Thus, a feature that limited by "first", "second" may expressly or implicitly include at least one of the features. In the description of the present application, the meaning of "plurality" is two or more, unless otherwise specifically defined.

Referring to "embodiments" in this specification means that specific features, structures, or characteristics described in connection with the embodiments may be included in at least one embodiment of the present disclosure. The phrase "embodiments" appearing at all locations in the specification does not necessarily refer to a same embodiment, or is an independent or alternative embodiment that is mutually exclusive from another embodiment. It is explicitly and implicitly understood by a person skilled in the art that the embodiments described in this specification may be combined with other embodiments.

An embodiment of the present application provides a display panel. The display panel includes but not limited to the following embodiments and a combination of the following embodiments.

Figure 2:
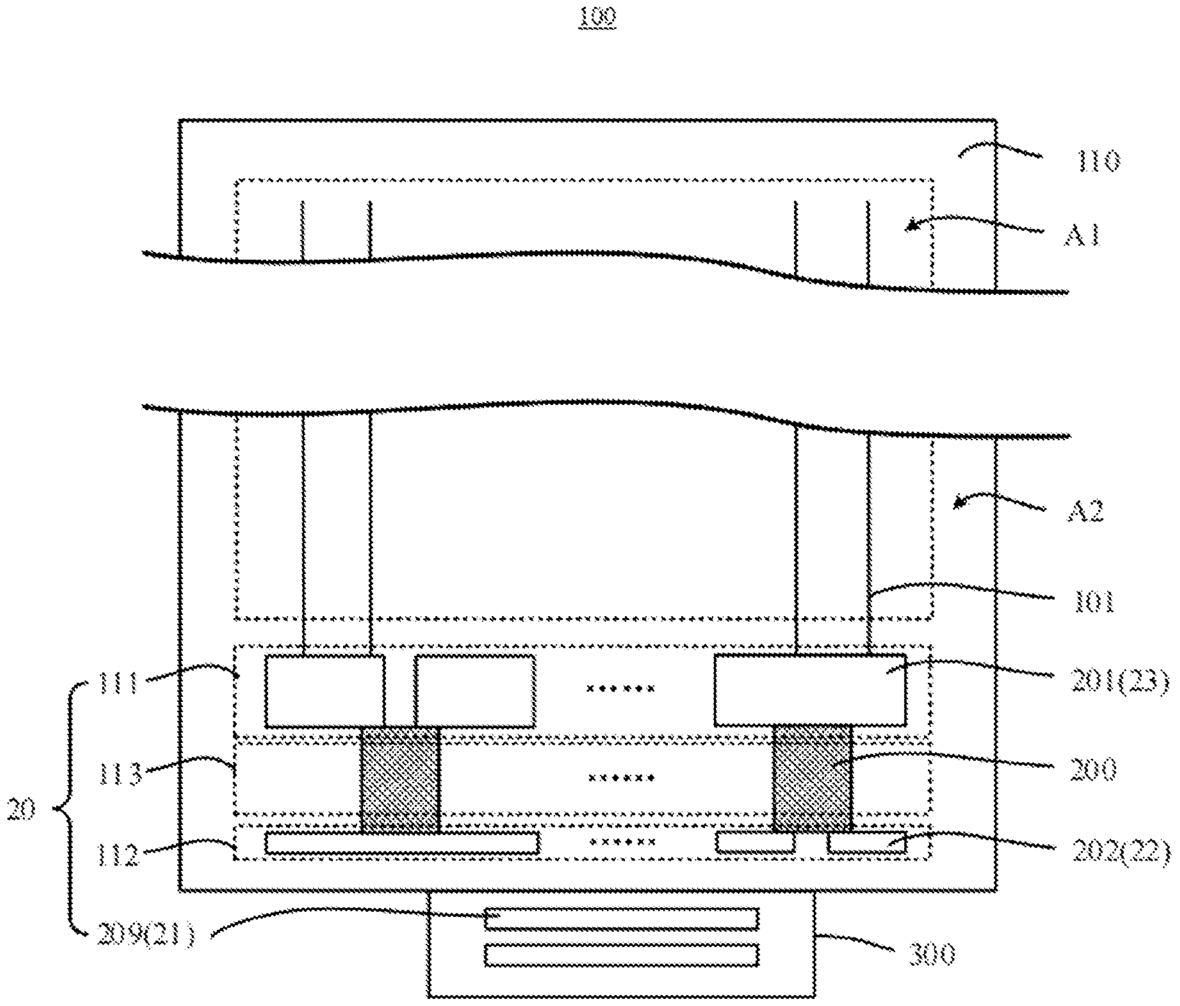
FIG. 2 is a schematic top view of another display panel according to an embodiment of the present application.

In an embodiment, as shown in FIGS. 1 and 2, the display panel 100 includes: an insulation substrate 110; a plurality of data lines 101 disposed on the insulation substrate 110; and a source driving circuit 20 electrically connected to the plurality of data lines 101 and including both a first module 111 and a second module 112 disposed on the insulation substrate 110; where the source driving circuit 20 further includes a strobe module 113 disposed on the insulation substrate 110 and connected between a plurality of output pins of the first module 111 and a plurality of input pins of the second module 112, the number of the output pins of the first module 111 is different from the number of the input pins of the second module 112, and the strobe module 113 is configured to control the output pins of the first module 111 to be electrically connected to different input pins of the second module 112 at different moments.

Specifically, the first module 111 may include a plurality of first parts 201, the second module 112 may include a plurality of second parts 202, and the strobe module 113 may include a plurality of strobe parts 200, the plurality of strobe parts 200 are connected between the plurality of first parts 201 and the plurality of second parts 202, the number of the first parts 201 is different from the number of the second parts 202, and the strobe parts 200 are configured to control the first parts 201 to be electrically connected to different second parts 202 at different moments. Each of the first parts 201 includes an input pin and an output pin, and each of the second parts 202 includes an input pin and an output pin. As can be seen from the foregoing, when the first module 111 transmits a signal to the second module 112, it can be considered that the number of output pins of the first module 111 is equal to the number of the first part 201, and the number of input pins of the second module 112 is equal to the number of the second part 202. Similarly, when the second module 112 transmits a signal to the first module 111, it can be considered that the number of output pins of the second module 112 is equal to the number of the second parts 202, and the number of input pins of the first module 111 is equal to the number of the first parts 201.

Specifically, as shown in FIGS. 1 and 2, the insulation substrate 110 may include a display region A1 and a non-display region A2 surrounding the display region A1. The plurality of data lines 101 may be disposed in the display region A1 to transmit a data signal generated by the source driving circuit 20 to a plurality of sub-pixels located in the display region A1, so as to control the illuminating brightness of the plurality of sub-pixels to realize display of a picture. The source driving circuit 20 may be disposed close to at least one side part of the insulation substrate 110 so as to be electrically connected to the plurality of data lines 101.

Figure 3:
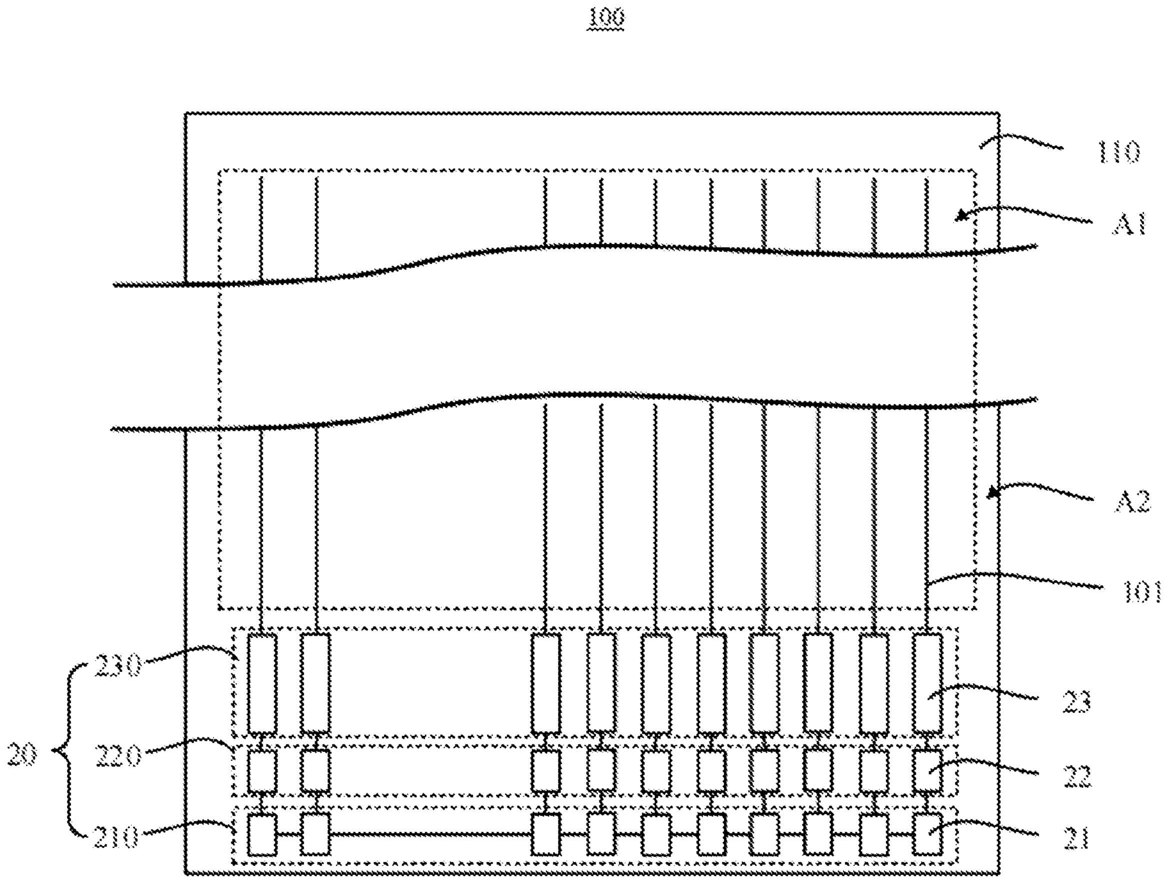
FIG. 3 is a schematic top view of a further display panel according to an embodiment of the present application.

It should be understood in the present embodiment that, on the one hand, the number of modules or devices of which the source driving circuit 20 is integrated in, for example, a chip can be reduced by disposing at least the first module 111, the second module 112, and the strode module 113 of the source driving circuit 20 on the insulation substrate 110 including the display region A1 and the non-display region A2, to reduce the size requirement of the high-cost chip, and thus the manufacturing cost of the source driving circuit 20. Specific modules, the types of devices, and the number of devices of the source driving circuit 20 disposed on the insulation substrate 110 are not limited herein, and can be distributed according to requirement such as performance. Further, as shown in FIG. 3, all the modules (including but not limited to a signal generation module 210 including a plurality of signal generation parts 21, a signal storage module 220 including a plurality of signal storage parts 22, a signal output module 230 including a plurality of signal output parts 23, the strode module 113 (not shown)) and all the devices in the source driving circuit 20 may be disposed on the insulation substrate 110. For example, as shown in FIG. 2, a part module 209 in the source driving circuit 20 may be disposed outside the insulation substrate 110, for example, on a chip 300 connected to the insulation substrate 110. The chip 300 may be fixed to the insulation substrate 110 by, but not limited to, binding the chip 300 to the side part or the back surface of the insulation substrate 110, or attaching the chip 300 to the non-display region A2.

It should be understood that, on the other hand, a plurality of strobe parts 200 connected to a plurality of first parts 201 and a plurality of second parts 202 are disposed in the present embodiment. By configuring the strobe parts 200 to control the first parts 201 to be electrically connected to different second parts 202 at different moments, at least one of following two functions that at least one of the first parts 201 can transmit a signal to at least two of the second parts 202 and at least one of the second parts 202 can transmit a signal to at least two of the first parts 201 can be implemented. That is, it is possible to implement at least one of following two functions that only the at least two second parts 202 need to be provided corresponding to one first part 201 instead of two and only the at least two first parts 201 need to be provided corresponding to one second part 202 instead of two. Compared with such a solution the plurality of first parts 201 are in one-to-one correspondence with the plurality of second parts 202, the present embodiment can reduce the number of at least one of the first parts 201 and the second parts 202, so as to reduce the size of at least one of the first module 111, the second module 112, and the strode module 113, to effectively reduce the occupied area of the source driving circuit 20, thereby reducing the size and cost of a carrier, which is not limited to the chip 300, the insulation substrate 110, or the like, for carrying the source driving circuit 20.

It should be noted in the present embodiment that the configuration of the first parts 201 and the second parts 202 as well as the strode parts 200 in the source driving circuit 20 can be reasonably defined so that the occupied area of the plurality of strode parts 200 added in the present embodiment can be smaller than the total occupied area of both the first parts 201 and the second parts 202 saved thereby in comparison with a solution in which the plurality of first parts 201 are in one-to-one correspondence with the plurality of second parts 202.

Figure 4:
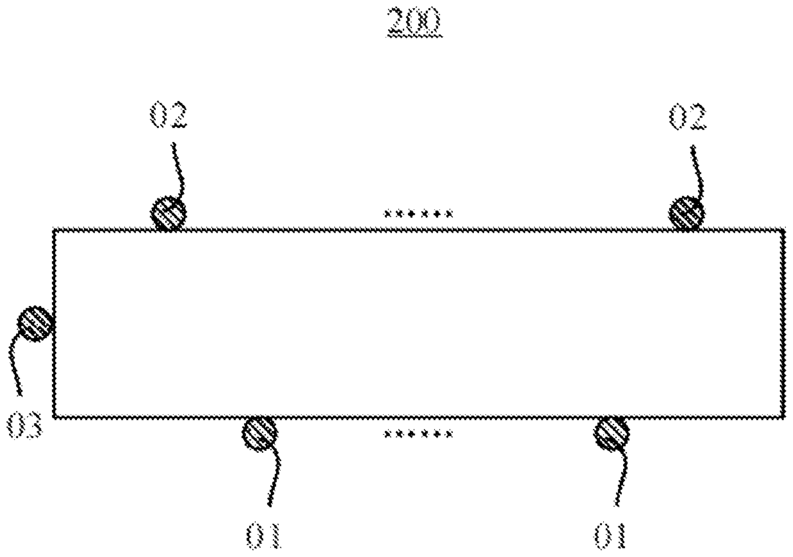
FIG. 4 is a structural diagram of a strode part according to an embodiment of the present application.
Figure 5:
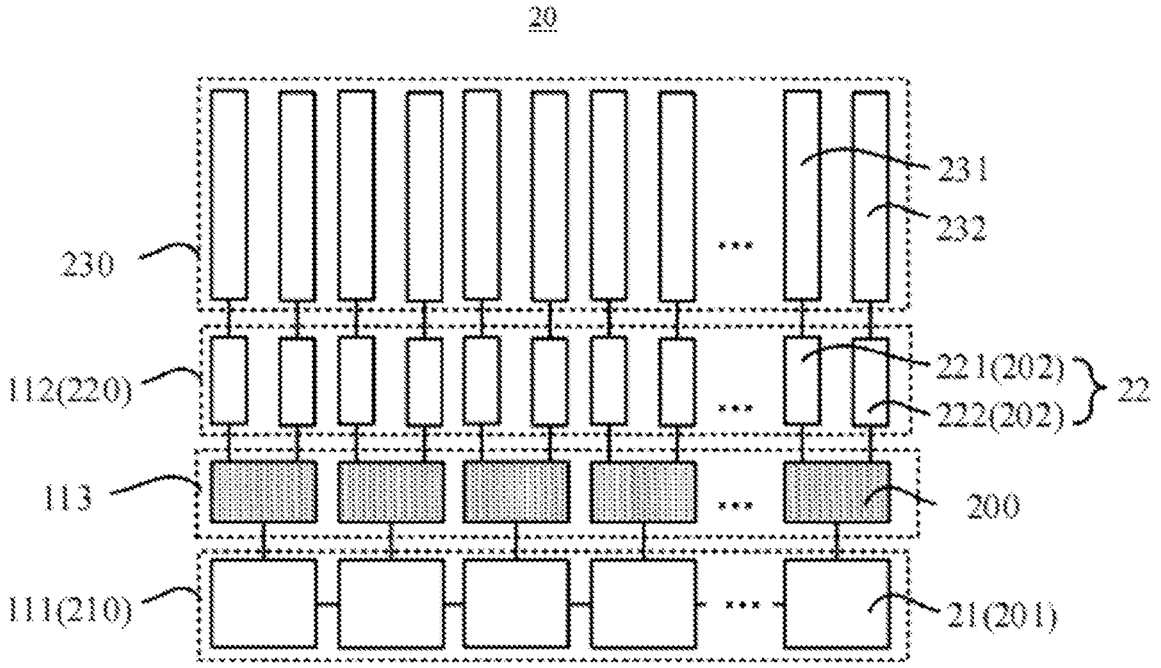
FIG. 5 is a structural diagram of a source driving circuit according to an embodiment of the present application.

In one embodiment, as shown in FIGS. 1 to 4, the strode module 113 includes a plurality of input terminals 01 connected to respective output pins of the first module 111, a plurality of output terminals 02 connected to respective input pins of the second module 112, and a plurality of control terminals 03 for loading control signals to enable the input terminals 01 to be electrically connected to different output terminals 02 at different moments, where the number of the input terminals 01 is different from the number of the output terminals 02. FIG. 4 illustrates only one strode part 200 in the strode module 113, and one of the input terminal 01 and the output terminal 02 of the strode part 200 may be equal to 1.

Specifically, as shown in FIGS. 1 to 4, in connection with the description of the plurality of first parts 201, the plurality of second parts 202 and the plurality of strode parts 200, each of the input terminals 01 is connected to one of the corresponding first part 201 and the corresponding second part 202, each of the output terminals 02 is connected to the other of the corresponding first part 201 and the corresponding second part 202, the number of the input terminals 01 is different from the number of the output terminals 02, and the control terminal 03 is configured to load the control signal to control the input terminals 01 to be electrically connected to the different output terminals 02 at different moments, or to control the output terminals 02 to be electrically connected to the different input terminals 01 at different moments. For one of the strobe parts 200, the number of input terminals 01 may be equal to the number of one of the first parts 201 and the second parts 202 corresponding to the strobe part 200, and the number of output terminals 02 may be equal to the number of the other of the first parts 201 and the second parts 202 corresponding to the strobe part 200.

Specifically, the specific number of the input terminals 01, the output terminals 02, and the control terminals 03 in the strobe part 200 is not limited in the present embodiment, as long as the number of the input terminals 01 is different from the number of the output terminals 02. Based on the above, the strobe part 200 having the appropriate number of the input terminals 01, the appropriate number of the output terminals 02, and the appropriate number of the control terminals 03 may be provided between the corresponding at least one first part 201 and the corresponding at least one second part 202 based on a corresponding relationship therebetween. By setting a control signal on each of the control terminals, it is possible to implement that the input terminals 01 are connected to different output terminals at different moments or the output terminals 02 are connected to different input terminals 01 at different moments, thereby realizing the time-sharing multiplexing of at least one of the first parts 201 and the second parts 202. As a result, compared with a solution that the plurality of first parts 201 are in one-to-one correspondence with the plurality of second parts 202, the number of at least one of the first parts 201 and the second parts 202 can be reduced, thereby reducing the size and cost of a carrier, which is not limited to a chip, an insulation substrate 110, or the like, for carrying the source driving circuit 20.

In one embodiment, as shown in FIGS. 1 to 6, the first module 111 includes a signal generation module 210, and the second module 112 includes a signal storage module 220; where the input terminal 01 is connected to an output pin of the signal generation module 210, the plurality of output terminals 02 of the strode module 113 include a first output terminal 021 and a second output terminal 022, the first output terminal 021 is connected to the corresponding first input pin of the signal storage module 220, and the second output terminal 022 is connected to the corresponding second input pin of the signal storage module 220; where the signal storage module 220 is configured to store first data generated by the signal generation module 210 in a first time period and second data generated by the signal generation module 210 in a second time period.

Specifically, as shown in FIGS. 1 to 6, in connection with the description of the plurality of first parts 201, the plurality of second parts 202 and the plurality of strode parts 200, the plurality of first parts of the first module 111 include a plurality of signal generation parts 21, and the plurality of second parts 202 of the second module 112 includes a plurality of first signal storage parts 221 and a plurality of second signal storage parts 222; where at least one of the output terminals 02 of the strode parts 200 in the strode module 113 includes a first output terminal 021 and a second output terminal 022, the input terminal 01 is connected to the signal generation part 21, the first output terminal is connected to the corresponding first signal storage part 221, and the second output terminal is connected to the corresponding second signal storage part 222; where the first signal storage part 221 is configured to store the first data generated by the signal generation part 21 in the first time period, and the second signal storage unit 222 is configured to store the second data generated by the signal generation part 21 in the second time period.

It should be understood in connection with the foregoing that, by disposing the strode part 200 including one input terminal 01, two output terminals 02 (the first output terminal 021 and the second output terminal 022) in the present embodiment, it is possible to implement that one signal generation part 21 can transmit the first data to the corresponding first signal storage part 221 and the second data to the corresponding second signal storage part 222 in a time-sharing manner, so that only one signal generation part 21 can be provided corresponding to the two signal storage parts. Compared with such a solution that the plurality of signal storage parts are in one-to-one correspondence with the plurality of signal generation parts 21, the present embodiment effectively reduces the number of the signal generation parts 21, thereby reducing the size and cost of a carrier, which is not limited to a chip, an insulation substrate 110, or the like, for carrying the source driving circuit 20.

Specifically, in combination with the foregoing, the signal generation part 21 may generate the first data in the first time period, and generate the second data in the second time period after the first period. Further, since the first signal storage part 221 and the second signal storage part 222 operate independently, the moment when the first data is stored in the first signal storage part 221 may be earlier than the moment when the second data is stored in the second signal storage part 222, so as to avoid signal interference caused by simultaneous transmission of the first data and the second data.

In one embodiment, as shown in FIGS. 2 to 6, the source driving circuit 20 further includes a signal output module 230 electrically connected between the signal storage module 220 and the plurality of data lines 101; where, at the same time, the signal storage module 220 is configured to transmit the first data and the second data to the signal output module 230.

Specifically, as shown in FIGS. 1 to 6, in connection with the description of the plurality of first parts 201, the plurality of second parts 202 and the plurality of strode parts 200, the source driving circuit 20 further includes a first signal output part 231 electrically connected between the corresponding first signal storage part 221 and the corresponding data line 101, and a second signal output part 232 electrically connected between the corresponding second signal storage part 222 and the corresponding data line 101; where, at the same time, the first signal storage part 221 transmits corresponding first data to the corresponding first signal output part 231, and the second signal storage part 222 transmits corresponding second data to the corresponding second signal output part 232.

Specifically, in connection with the foregoing, the moment when the first data is stored in the first signal storage part 221 may be earlier than the moment when the second data is stored in the second signal storage part 222. Further, in the present embodiment, while the first signal storage unit 221 transmits the corresponding first data to the corresponding first signal output part 231, the second signal storage part 222 transmits the corresponding second data to the corresponding second signal output part 232. That is, it is possible to implement that the corresponding first signal output part 231 may receive the first data and the corresponding second signal output unit 232 may receive the second data at the same time, so that the consistency of transmission of the first data and the second data may be subsequently improved. Still further, the plurality of first signal output parts 231 and the plurality of second signal output parts 232 may transmit the plurality of first data and the plurality of second data to the plurality of data lines 101 at the same time, so as to further improve the consistency of the light emission moments of the plurality of sub-pixels in the same row.

In one embodiment, as shown in FIGS. 2 to 6, the strode module 113 includes a plurality of first transistors T1 and second transistors T2; where a source of the first transistor T1 and a source of the second transistor T2 are both configured as respective input terminals 01, a gate of the first transistor T1 and a gate of the second transistor T2 are both configured as respective control terminals 03, a drain of the first transistor T1 is configured as corresponding first output terminal 021, and a drain of the second transistor T2 is configured as corresponding second output terminal 022.

In one embodiment, as shown in FIGS. 1 to 6, in connection with the description of the plurality of first parts 201, the plurality of second parts 202 and the plurality of strode parts 200, each of the strode parts 200 includes a first transistor T1 and a second transistor T2; where a source of the first transistor T1 and a source of the second transistor T2 are both configured as input terminals 01 of the strode part 200, a gate of the first transistor T1 and a gate of the second transistor T2 are configured as at least one control terminal 03 of the strode part 200, a drain of the first transistor T1 is configured as a first output terminal 021 of the strode part 200, and a drain of the second transistor T2 is configured as a second output terminal 022 of the strode part 200.

In connection with the foregoing, a control signal loaded on the at least one control terminal 03 can be controlled to control the first transistor T1 and the second transistor T2 to be turned on or off at the same time. Specifically, one of the first transistor T1 and the second transistor T2 is turned on, while the other is turned off, so that it is possible to implement that the signal generation part 21 can transmit the first data to the corresponding first signal storage part 221 or transmit the second data to the corresponding second signal storage part 222 to respectively realize the transmission of the first data and the second data at two different moments so as to avoid signal interference caused by the simultaneous transmission of the first data and the second data.

Figure 6:
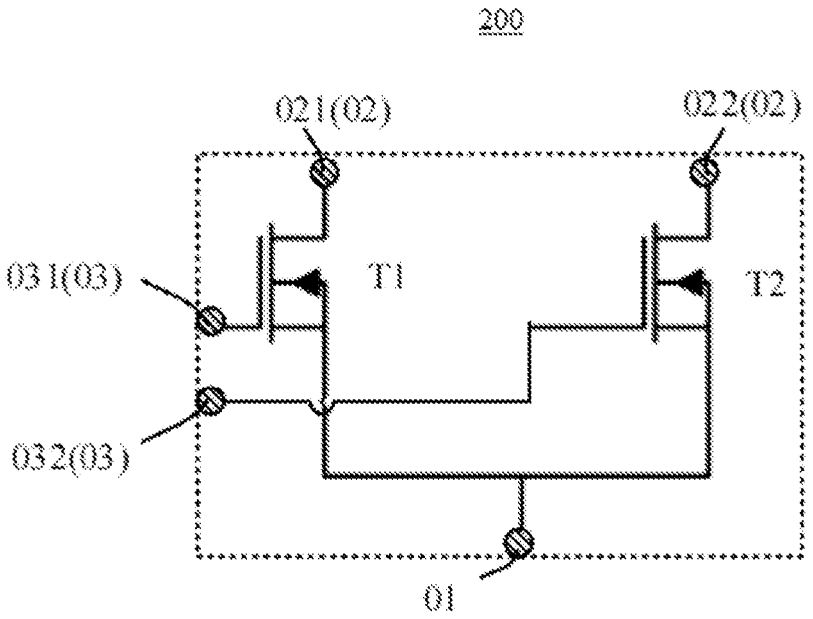
FIG. 6 is a schematic circuit diagram of a strode part according to an embodiment of the present application.
Figure 7:
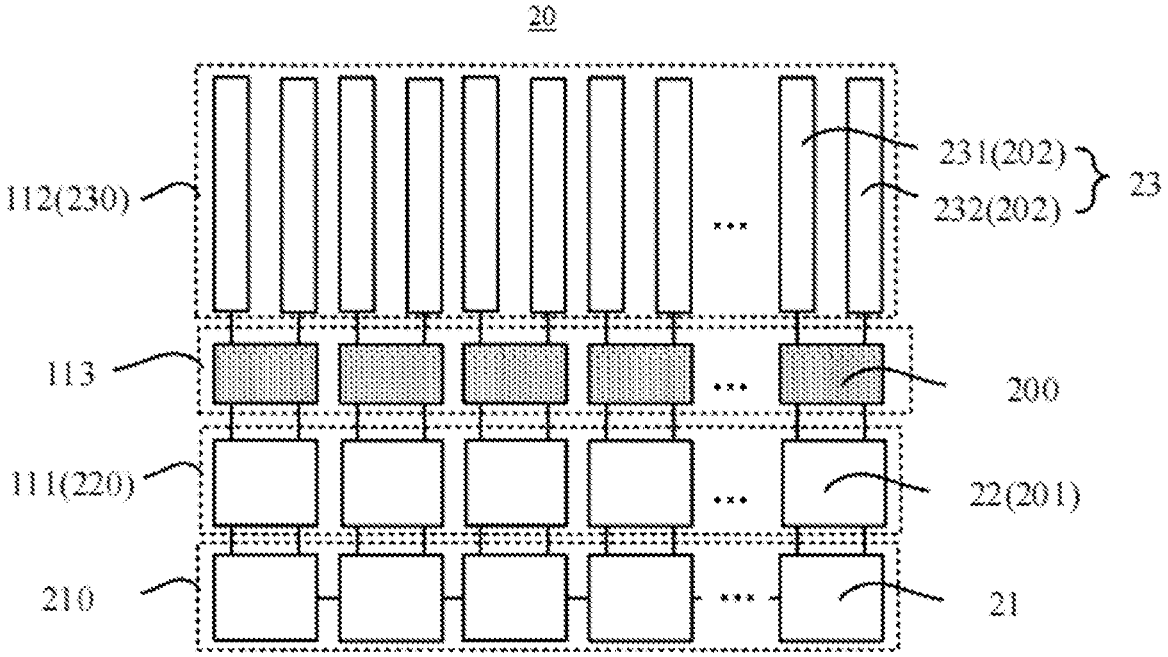
FIG. 7 is a structural diagram of another source driving circuit according to an embodiment of the present application.

Specifically, the number of corresponding control terminals 03 is not limited in the present embodiment. For example, as shown in FIG. 6, the strode part 200 may include two control terminals 03 (that is, the first control terminal 031 and the second control terminal 032), the gate of the first transistor T1 may be configured as the first control terminal 031 of the strode part 200, and the gate of the second transistor T2 may be configured as the second control terminal 032 of the strode part 200. Based on the above, the first control signal may be loaded on the first control terminal 031, and the second control signal may be loaded on the second control terminal 032, so as to individually control the first transistor T1 and the second transistor T2 to be turned on or off, where the first control signal and the second control signal may be reverse signals of each other. For another example, the strode part 200 may include a control terminal 03, one of the gate of the first transistor T1 and the gate of the second transistor T2 may be configured as the control terminal 03 of the strode part 200, and the other of the gate of the first transistor T1 and the gate of the second transistor T2 may be electrically connected to the control terminal 03 through an inverter or a non-gate circuit, so that the closing of the first transistor T1 is opposite to that of the second transistor T2.

In one embodiment, as shown in FIGS. 2 to 4 and FIGS. 7 to 8, the first module 111 includes a signal storage module 220, and the second module 112 includes a signal output module 230 connected between the signal storage module 220 and the plurality of data lines 101. The plurality of input terminals 01 of the strode module 113 include a first input terminal 011 and a second input terminal 012, the plurality of output terminals 02 of the strode module 113 include a first output terminal 021 and a second output terminal 022, the first input terminal 011 is connected to a first output pin of the signal storage module 220, the second input terminal 012 is connected to a second output pin of the signal storage module 220, the first output terminal 021 is connected to the corresponding first input pin of the signal output module 230, and the second output terminal 022 is connected to the corresponding second input pin of the signal output module 230.

Specifically, as shown in FIGS. 2 to 4 and FIGS. 7 to 8, in connection with the description of the plurality of first parts 201, the plurality of second parts 202 and the plurality of strode parts 200, the plurality of first parts 201 includes a plurality of signal storage parts 22, and the plurality of second parts 202 includes a plurality of first signal output parts 231 and a plurality of second signal output parts 232, and the plurality of first signal output parts 231 and the plurality of second signal output parts 232 are connected to the plurality of data lines 101. At least one input terminal 01 of the strode part 200 includes a first input terminal 011 and a second input terminal 012, at least two output terminals 02 of the strode part 200 include a first output terminal 021 and a second output terminal 022, the input terminal is connected to the signal storage part 22, the first output terminal 021 is connected to a corresponding one of the first signal output parts 231, and the second output terminal 022 is connected to a corresponding one of the second signal output parts 232.

It should be understood in connection with the foregoing that, by disposing the strode part 200 including two input terminals 01 (i.e., the first input terminal 011 and the second input terminal 012), two output terminals 02 (i.e., the first output terminal 021 and the second output terminal 022) in the present embodiment, it is possible to implement that one signal storage part 22 can transmit the first data to the corresponding first signal output part 231 and the second data to the corresponding second signal output part 232 at the same time, or vice versa, so that only one signal storage part 22 can be provided corresponding to the two signal output parts. Compared with such a solution that the plurality of signal storage parts are in one-to-one correspondence with the plurality of signal output parts 21, the present embodiment effectively reduces the number of the signal storage parts 22, thereby reducing the size and cost of a carrier, which is not limited to a chip, an insulation substrate 110, or the like, for carrying the source driving circuit 20.

Specifically, based on the difference between the first signal output part 231 and the second signal output part 232 as described above, the strode part 200 may control the first data stored in the signal storage part 22 to be transmitted to the first signal output part 231 and the second data to be transmitted to the second signal output unit 232, or vice versa, so as to prevent the transmission path from being unrecognized when the first data and the second data are simultaneously transmitted.

Figure 8:
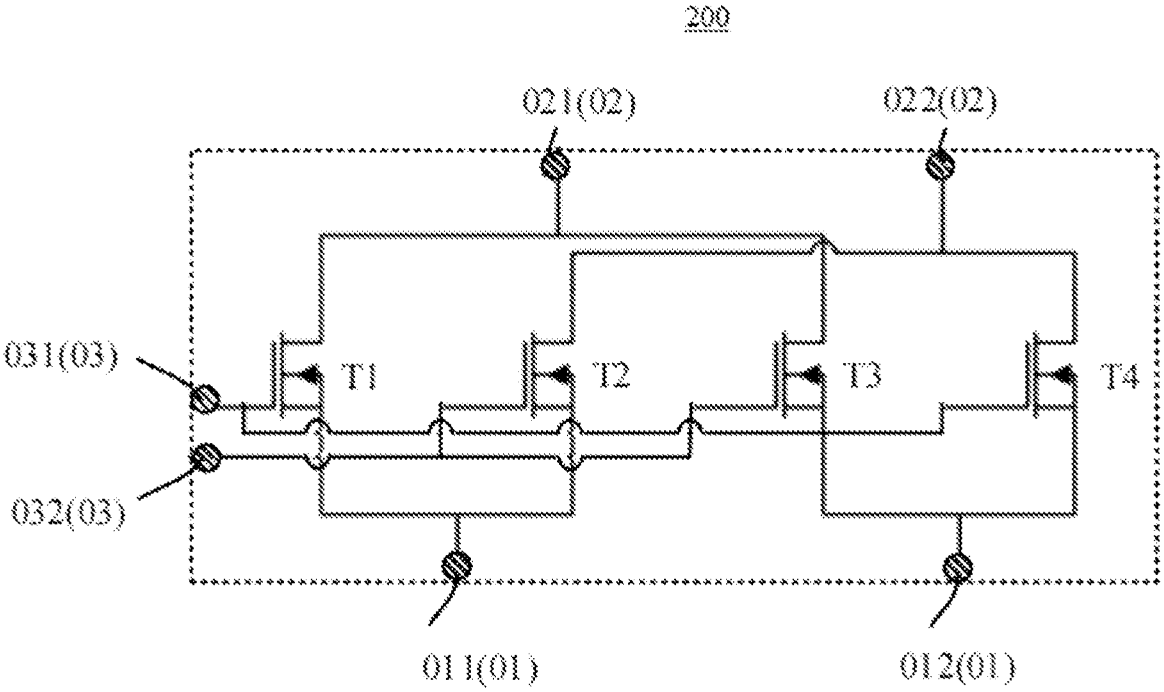
FIG. 8 is a schematic circuit diagram of another strode part according to an embodiment of the present application.
Figure 9:
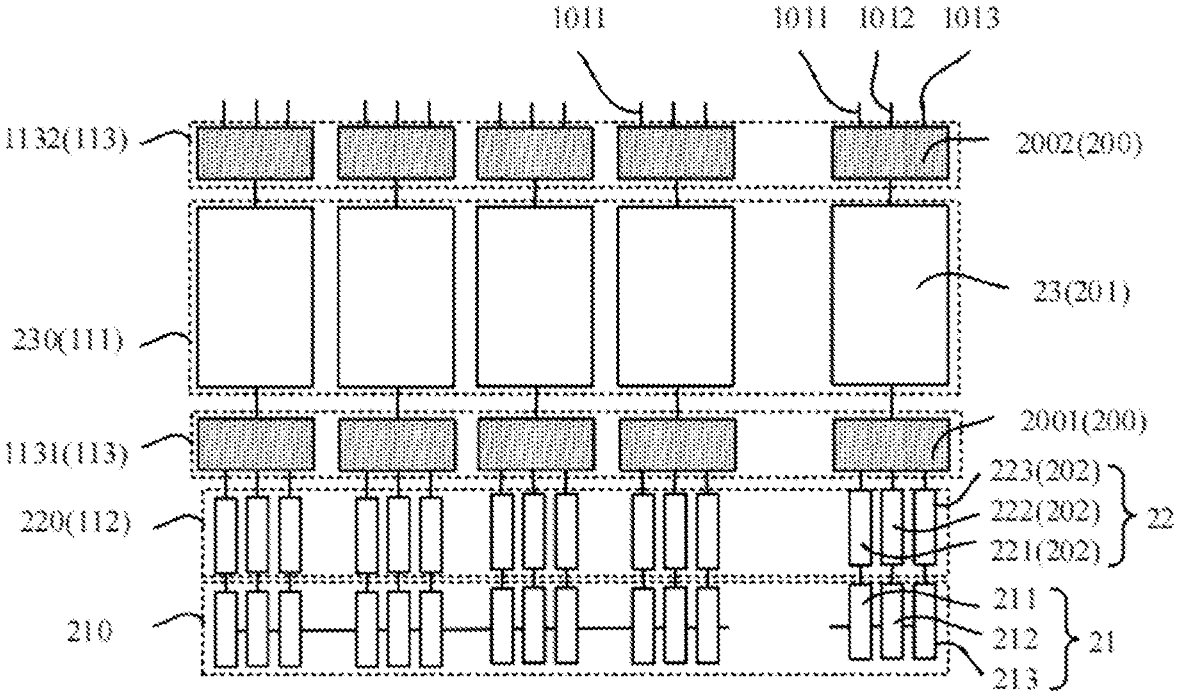
FIG. 9 is a structural diagram of a further source driving circuit according to an embodiment of the present application.

Alternatively, the strode part 200 may be disposed between the signal output part (e.g., the first signal output part 231 or the second signal output part 232) and the respective adjacent two (e.g., the first data line and the second data line) of the data lines 101, as shown in FIG. 8. The two input terminals 01 of the strode part 200 may be electrically connected to the signal output part, and the two output terminals 02 of the strode part 200 may be electrically connected to the corresponding first data line and the corresponding second data line. For details, reference may be made to the above description. Similarly, based on the number of the plurality of data lines 101 being identical, the number of signal output parts may be further described herein.

In an embodiment, as shown in FIGS. 2 to 4 and FIGS. 7 to 8, the source driving circuit 20 further includes a signal generation module 210 electrically connected to the signal storage module 220. At the same time, the plurality of signal generation modules 210 are configured to generate first data and second data, and a first input pin of the signal output module 230 is configured to receive the corresponding first data while a second input pin of the signal output module 230 is configured to receive the corresponding second data.

Specifically, as shown in FIGS. 2 to 4 and FIGS. 7 to 8, in connection with the description of the plurality of first parts 201, the plurality of second parts 202 and the plurality of strode parts 200, the source driving circuit 20 further includes a plurality of signal generation parts 21 electrically connected to the plurality of signal storage parts 22, and the plurality of data lines 101 are electrically connected to the plurality of first signal output parts 231 and the plurality of second signal output parts 232. At the same time, the plurality of signal generation parts 21 are configured to generate the first data and the second data, and the first signal output part 231 is configured to receive the corresponding first data, while the second signal output part 232 is configured to receive the corresponding second data. It should be understood that the signal generation part 21 may simultaneously generate and transmit the first data and the second data to the corresponding one of the signal storage parts 22, respectively. Further, the strode part 200 may transmit the received first data to one of the first signal output part 231 and the second signal output part 232 while transmitting the received second data to the other of the first signal output part 231 and the second signal output part 232. Therefore, the number of the signal generation parts 21 can be reduced in the present embodiment.

In an embodiment, as shown in FIGS. 2 to 4 and FIGS. 7 to 8, the strode module 113 includes a first transistor T1, a second transistor T2, a third transistor T3, and a fourth transistor T4. A source of the first transistor T1 and a source of the second transistor T2 are both configured as the first input terminals 011, a source of the third transistor T3 and a source of the fourth transistor T4 are both configured as the corresponding second input terminals 012, a gate of the first transistor T1, a gate of the second transistor T2, a gate of the third transistor T3, and a gate of the fourth transistor T4 are all configured as the respective control terminals 03, a drain of the first transistor T1 and a drain of the third transistor T3 are both configured as the corresponding first output terminal 021, and a drain of the second transistor T2 and a drain of the fourth transistor T4 are both configured as the corresponding second output terminal 022.

Specifically, as shown in FIGS. 2 to 4 and FIGS. 7 to 8, in connection with the description of the plurality of first parts 201, the plurality of second parts 202 and the plurality of strode parts 200, each of the strode parts 200 includes a first transistor T1, a second transistor T2, a third transistor T3, and a fourth transistor T4. The source of the first transistor T1 and the source of the second transistor T2 are both configured as the first input terminals 011 of the strode part 200, the source of the third transistor T3 and the source of the fourth transistor T4 are both configured as the second input terminals 012 of the strode part 200, the gate of the first transistor T1, the gate of the second transistor T2, the gate of the third transistor T3 and the gate of the fourth transistor T4 are all configured as at least one control terminal 03 of the strode part 200, the drain of the first transistor T1 and the drain of the third transistor T3 are all configured as the first output terminals 021 of the strode part 200, and the drain of the second transistor T2 and the drain of the fourth transistor T4 are both configured as the second output terminals 022 of the strode part 200.

In connection with the foregoing, a control signal loaded on the at least one control terminal 03 can be controlled to control the first transistor T1, the second transistor T2, the third transistor T3, and the fourth transistor T4 to be turned on or off at the same time. Specifically, the first transistor T1 and the fourth transistor T4 are turned on at the same time, while the second transistor T2 and the third transistor T3 are turned off. Alternatively, the first transistor T1 and the fourth transistor T4 are turned off at the same time, while the second transistor T2 and the third transistor T3 are turned on, to simultaneously realize that the first data in the signal storage part 22 is transmitted to the first signal output part 231 and the second data is transmitted to the second signal output part 232, or vice versa. Specifically, the present embodiment may be applied to, for example, column inversion. For example, the first data may be a positive signal and the second data may be a negative signal. Further, both the first transistor T1 and the fourth transistor T4, and both the second transistor T2 and the third transistor T3 may be alternately turned on or off, so that the respective two of the data lines 101 may be mutually inverted and alternately loaded as a positive signal and a negative signal.

Specifically, the number of respective control terminals 03 is not limited in the present embodiment. For example, as shown in FIG. 8, the strode part 200 may include two control terminals 03 (that is, the first control terminal 031 and the second control terminal 032), the gate of the first transistor T1 and the gate of the fourth transistor T4 may be both configured as the first control terminals 031 of the strode part 200, and the gate of the second transistor T2 and the gate of the third transistor T3 may be both configured as the second control terminals 032 of the strode part 200. Based on the above, the first control signal may be loaded on the first control terminal 031, and the second control signal may be loaded on the second control terminal 032 in connection with the above description, where the first control signal and the second control signal may be reverse signals of each other. For another example, the strode part 200 may include one, three, or four of the control terminals 03. For details, reference may be made to the above related description of the control terminals 03 in FIG. 6.

In one embodiment, as shown in FIGS. 2 to 4 and FIGS. 9 to 11, the first module 111 includes a signal output module 230, and the second module 112 includes a signal storage module 220, and the plurality of data lines 101 include a plurality of first data lines 1011, a plurality of second data lines 1012, and a plurality of third data lines 1013. The strode module 113 includes a first strode module 1131 connected between the first module 111 and the second module 112, and a second strode module 1132 connected between the first module 111 and the plurality of data lines 101. The plurality of input terminals 01 of the first strode module 1131 include a first input terminal 011, a second input terminal 012 and a third input terminal 013, and the plurality of output terminals 02 of the first strode module 1131 include a first output terminal 021, where the first input terminal 011 is connected to a first output pin of the signal storage module 220, the second input terminal 012 is connected to a second output pin of the signal storage module 220, the third input terminal 013 is connected to a third output pin of the signal storage module 220, and the first output terminal 021 is connected to the corresponding input pin of the signal output module 230. The plurality of input terminals 01 of the second strode module 1132 include a fourth input terminal 014, and the plurality of output terminals 02 of the second strode module 1132 include a second output terminal 022, a third output terminal 023 and a fourth output terminal 024, where the fourth input terminal 014 is connected to the corresponding output pin of the signal output module 230, the second output terminal 022 is connected to the corresponding first data line 1011, the third output terminal 023 is connected to the corresponding second data line 1012, and the fourth output terminal 024 is connected to the corresponding third data line 1013.

Specifically, as shown in FIGS. 2 to 4 and FIGS. 9 to 11, in connection with the description of the plurality of first parts 201, the plurality of second parts 202 and the plurality of strode parts 200, the plurality of first parts 201 include a plurality of signal output parts 23, the plurality of second parts 202 include a plurality of first signal storage parts 221, a plurality of second signal storage parts 222, and a plurality of third signal storage parts 223, and the plurality of data lines 101 includes a plurality of first data lines 1011, a plurality of second data lines 1012, and a plurality of third data lines 1013. The plurality of strobe parts 200 include a plurality of first strobe parts 2001 connected between the plurality of first parts 201 and the plurality of second parts 202, and a plurality of second strobe parts 2002 connected between the plurality of first parts 201 and the plurality of data lines 101. As shown in FIGS. 2, 4, 9, and 10, at least one input terminal 01 of the first strode part 2001 includes a first input terminal 011, a second input terminal 012, and a third input terminal 013, and at least one output terminal 02 of the first strode part 2001 includes a first output terminal 021, where the first input terminal 011 is connected to the corresponding first signal storage part 221, the second input terminal 012 is connected to the corresponding second signal storage part 222, the third input terminal 013 is connected to the corresponding third signal storage part 223, and the first output terminal 021 is connected to the corresponding signal output part 23. at least one input terminal 01 of the second strode part 2002 includes a fourth input terminal 014, and at least one output terminal 02 of the second strode part 2002 includes a second output terminal 022, a third output terminal 023, and a fourth output terminal 024, where the fourth input terminal 014 is connected to the corresponding signal output part 23, the second output terminal 022 is connected to the corresponding first data line 1011, the third output terminal 023 is connected to the corresponding second data line 1012, and the fourth output terminal 024 is connected to the corresponding third data line 1013.

On the one hand, it should be understood in connection with the foregoing that, by disposing the first strode part 2001 including three input terminals 01 and one output terminal 02 in the present embodiment, it is possible to implement that the first signal storage part 221, the second signal storage part 222, and the third signal storage part 223 transmit the respective data to the signal output part 23 in a time-sharing manner. That is, one signal output part 23 can receive the first data transmitted by the corresponding first signal storage part 221, the second data transmitted by the corresponding second signal storage part 222, and the third data transmitted by the corresponding third signal storage part 223 in a time-sharing manner, so that only one signal output part 23 can be provided corresponding to the three signal storage parts. Compared with such a solution that the plurality of signal storage parts are in one-to-one correspondence with the plurality of signal output parts 23, the present embodiment effectively reduces the number of the signal output parts 23, thereby reducing the size and cost of a carrier, which is not limited to a chip, an insulation substrate 110, or the like, for carrying the source driving circuit 20.

On the other hand, as can be known in connection with the above that, by disposing the first strode part 2001 including three input terminals 01 and one output terminal 02 in the present embodiment, it is possible to implement that the signal output part 23 transmits the respective data to the first data line 1011, the second data line 1012, and the third data line 1013 in a time-sharing manner. That is, the first data line 1011, the second data line 1012, and the third data line 1013 can receive the first data (corresponding to the first data line 1011), the second data (corresponding to the first data line 1012), and the third data (corresponding to the third data line 1013) transmitted by the corresponding signal output part 23 in a time-sharing manner. Compared with such a solution that the plurality of data lines 101 are in one-to-one correspondence with the plurality of signal output parts 23, the present embodiment effectively reduces the number of the signal output parts 23, thereby reducing the size and cost of a carrier, which is not limited to a chip, an insulation substrate 110, or the like, for carrying the source driving circuit 20.

It should be understood in connection with the above both aspects, the present embodiment can effectively reduce the number of the signal output parts 23 by disposing the first strode part 2001 and the second strode part 2002. In view of the low operating frequency requirement of the signal output part 23, one signal output part 23 can process respective signals of the three signal storage parts in a time-sharing manner within a unit time. Further, a latch may be disposed between the second strode part 2002 and the respective three data lines to enable the first data line 1011, the second data line 1012, and the third data line 1013 to load the respective data at the same time, thereby improving the consistency of the light emission moments of the plurality of sub-pixels in the same row.

In an embodiment, as shown in FIGS. 2 to 4 and FIGS. 9 to 11, the source driving circuit 20 further includes a signal generation module 210 electrically connected to the signal storage module 220. The signal output module 230 is configured to transmit the first data output from the first output pin of the signal generation module 210 to the corresponding first data line 1011, transmit the second data output from the second output pin of the signal generation module 210 to the corresponding second data line 1012, and transmit the third data output from the third output pin of the signal generation module 210 to the corresponding third data line 1013.

Specifically, as shown in FIGS. 2 to 4 and FIGS. 9 to 11, in connection with the description of the plurality of first parts 201, the plurality of second parts 202 and the plurality of strode parts 200, the source driving circuit 20 further includes a plurality of first signal generation parts 211, a plurality of second signal generation parts 212, and a plurality of third signal generation parts 213 electrically connected to the plurality of first signal storage parts 221, the plurality of second signal storage parts 222, and the plurality of third signal storage parts 223, respectively. The signal output part 23 is configured to transmit the first data generated by the first signal generation part 211 to the corresponding first data line 1011, to transmit the second data generated by the second signal generation part 212 to the corresponding second data line 1012, and to transmit the third data generated by the third signal generation part 213 to the corresponding third data line 1013.

It should be understood that, since the operating frequency of the signal generation part 21 is high, the number of the signal generation parts 21 is set to be equal to the number of the respective data lines 101 in the present embodiment. For example, in one group of pixels, three sub-pixels of different colors are electrically connected to the respective three data lines 101, respectively. Therefore, the respective three data can be generated at the same time by the respective three signal generation part 21 while they operate, and the respective three data can be outputted at the same time by the same signal output part 21 which has a shorter time of processing the data, to improve the consistency of the light emission moments of the plurality of sub-pixels in the same row.

In an embodiment, as shown in FIGS. 2 to 4 and FIGS. 9 to 10, the first strode module 1131 includes a first transistor T1, a second transistor T2, and a third transistor T3. A source of the first transistor T1 is configured as the first input terminal 012, a source of the second transistor T2 is configured as the second input terminal 012, and a drain of the third transistor T3 is configured as the corresponding third input terminal 013, a gate of the first transistor T1, a gate of the second transistor T2, and a gate of the third transistor T3 are all configured as the respective control terminals 03, a drain of the first transistor T1, a drain of the second transistor T2, and a drain of the third transistor T3 are all configured as the corresponding first output terminals 021.

Specifically, as shown in FIGS. 2 to 4 and FIGS. 9 to 11, in connection with the description of the plurality of first parts 201, the plurality of second parts 202 and the plurality of strode parts 200, each of the strode parts 200 includes a first transistor T1, a second transistor T2, and a third transistor T3. The source of the first transistor T1 is configured as the first input terminal 011, the drain of the second transistor T2 is configured as the second input terminal 012, the drain of the third transistor T3 is configured as the third input terminal 013, the gate of the first transistor T1, the gate of the second transistor T2, and the gate of the third transistor T3 are all configured as the control terminals 03, and the drain of the first transistor T1, the drain of the second transistor T2, and the drain of the third transistor T3 are all configured as the first output terminals 021.

In combination with the foregoing, a control signal loaded on the at least one control terminal 03 can be controlled to control the first transistor T1, the second transistor T2, and the third transistor T3 to be turned on or off at the same time. Specifically, one of the first transistor T1, the second transistor, and the third transistor T3 is turned on, while the other two are turned off, so that it is possible to implement that the first signal storage part 221, the second signal storage part 222, and the third signal storage part 223 can transmit respective data to the signal output part 23 in a time-sharing manner, so as to avoid signal interference caused by the simultaneous transmission of the plurality of data.

Figure 10:
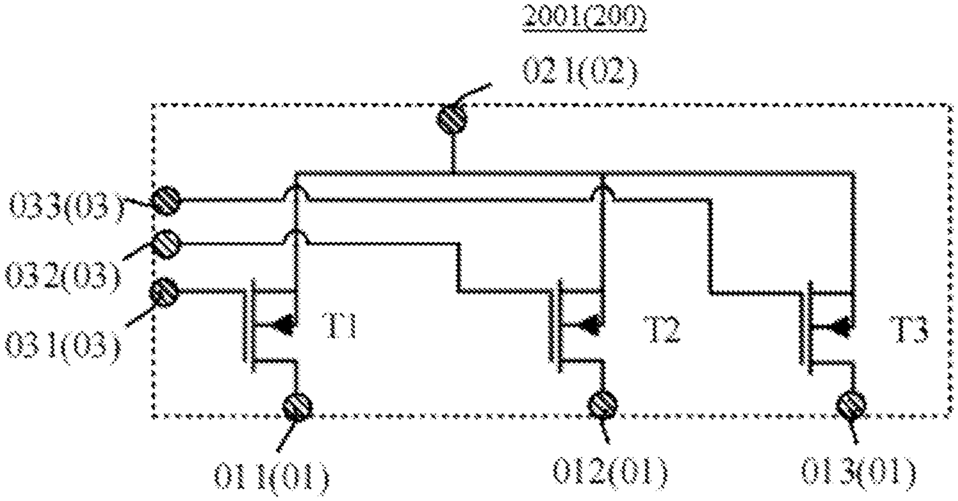
FIG. 10 is a schematic circuit diagram of a first strode part according to an embodiment of the present application.

Specifically, the number of respective control terminals 03 is not limited in the present embodiment. For example, as shown in FIG. 10, the strode part 200 may include three control terminals 03 (that is, the first control terminal 031, the second control terminal 032, and the third control terminal 033). The gate of the first transistor T1 may be configured as the first control terminal 031, the gate of the second transistor T2 may be configured as the second control terminal 032, and the gate of the third transistor T3 may be configured as the third control terminal 033. Similarly, Turning on or off the first transistor T1, the second transistor T2, and the third transistor T3 may be controlled separately to control the three to be turned on or off in a time-sharing manner.

In an embodiment, as shown in FIGS. 2 to 4, 9 and 11, the second strode module includes a fourth transistor T4, a fifth transistor T5, and a sixth transistor T6. A source of the fourth transistor T4, a source of the fifth transistor T5, and a source of the sixth transistor T6 are all configured as the fourth input terminals 014, a gate of the fourth transistor T4, a gate of the fifth transistor T5, and a gate of the sixth transistor T6 are all configured as the respective control terminals 03, a drain of the fourth transistor T4 is configured as the second output terminal 022, a drain of the fifth transistor T5 is configured as the corresponding third output terminal 023, and a drain of the sixth transistor T6 is configured as the corresponding fourth output terminal 024.

Specifically, as shown in FIGS. 2 to 4 and FIGS. 9 to 11, in connection with the description of the plurality of first parts 201, the plurality of second parts 202 and the plurality of strode parts 200, the second strode part 2002 includes a fourth transistor T4, a fifth transistor T5, and a sixth transistor T6. The source of the fourth transistor T4, the source of the fifth transistor T5, and the source of the sixth transistor T6 are all configured as the fourth input terminals 014 of the second strode part 2002, the gate of the fourth transistor T4, the gate of the fifth transistor T5, and the gate of the sixth transistor T6 are all configured as at least one control terminal 03 of the second strode part 2002, the drain of the fourth transistor T4 is configured as the second output terminal 022 of the second strode part 2002, the drain of the fifth transistor T5 is configured as the third output terminal 023 of the second strode part 2002, and the drain of the sixth transistor T6 is configured as the fourth output terminal 024 of the second strode part 2002.

In combination with the foregoing, a control signal loaded on the at least one control terminal 03 can be controlled to control the fourth transistor T4, the fifth transistor T5, and the sixth transistor T6 to be turned on or off at the same time. Specifically, one of the fourth transistor T4, the fifth transistor T5, and the sixth transistor T6 is turned on, while the other two are turned off, so that it is possible to implement that the signal output part 23 transmits respective data to the first data line 1011, the second data line 1012, and the third data line 1013, so as to avoid signal interference caused by the simultaneous transmission of the plurality of data.

Figure 11:
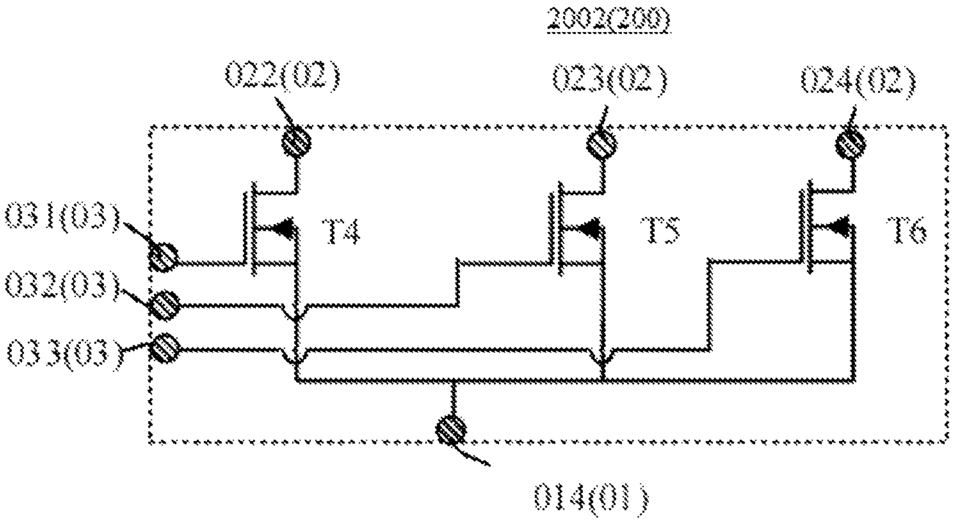
FIG. 11 is a schematic circuit diagram of a second strode part according to an embodiment of the present application.

Specifically, the number of respective control terminals 03 is not limited in the present embodiment. For example, as shown in FIG. 11, the strode part 200 may include three control terminals 03 (that is, the first control terminal 031, the second control terminal 032, and the third control terminal 033). The gate of the fourth transistor T4 may be configured as the first control terminal 031, the gate of the fifth transistor T5 may be configured as the second control terminal 032, and the gate of the sixth transistor T6 may be configured as the third control terminal 033. Similarly, Turning on or off the fourth transistor T4, the fifth transistor T5, and the sixth transistor T6 may be controlled separately to control the three to be turned on or off in a time-sharing manner.

In one embodiment, as shown in FIGS. 2, 3, 5, 7, and 9, the display panel 100 includes a signal generation module 210, a signal storage module 220, and a signal output module 230, where the signal storage module 220 is connected between the signal generation module 210 and the signal output module 230. The first module 111 includes one of the signal generation module 210, the signal storage module 220, and the signal output module 230, and the second module 112 includes one of the signal generation module 210, the signal storage module 220, and the signal output module 230 that is different from the second module 112.

Figure 12:
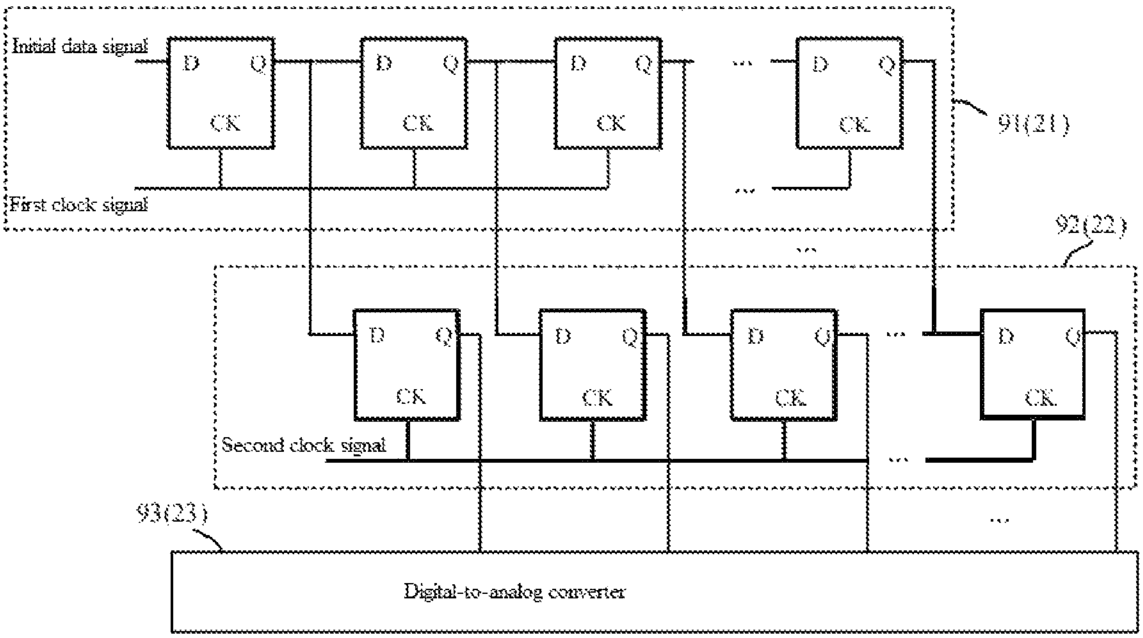
FIG. 12 is a structural diagram of a further source driving circuit according to an embodiment of the present application.
Figure 13:
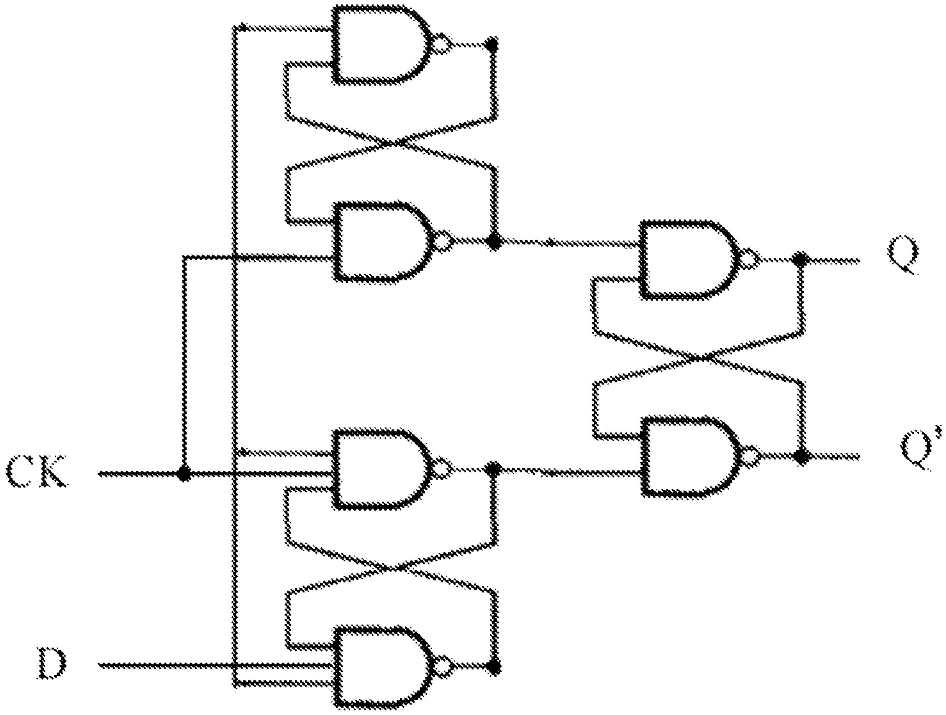
FIG. 13 is a structural diagram of a minimum unit in a shift register and a latch according to an embodiment of the present application.

As shown in FIG. 12, the signal generation part 21 may include a shift register 91, and the signal storage part 22 may include a latch 92. The shift register 91 may be a serial input register or a parallel output register. The number of bits of the latch 92 may be equal to the number of bits of the shift register 91. The shift register 91 and the latch 92 may include cascaded multi-stage D flip-flops, and the number of stages of the D flip-flops is the same therebetween. Specifically, in the shift register 91, a D terminal of the first stage D flip-flop loads an initial data signal, a CK terminal of the multi-stage D flip-flops loads a first clock signal, a Q terminal of the present stage D flip-flop is connected to the D terminal of the next stage D flip-flop and the D terminal of the D flip-flop of the corresponding stage in the latch 92, and the CK terminal of the multi-stage D flip-flops in the latch 92 loads a second clock signal, so as to simultaneously release a plurality of parallel data in the initial data signal to a digital-to-analog converter 93 in the signal output part 23. Specifically, with reference to FIG. 13, the specific circuit structure of the D flip-flop in the shift register 91 and the latch 92 may be made up of a plurality of NAND gate circuit connections, where the data output at the Q' terminal is opposite to the data output at the Q terminal.

Further, the signal output part 23 may further include a level shifter and a decoder. The level shifter may be electrically connected to the latch, and the decoder may be electrically connected between the level shifter and the digital-to-analog converter. Still further, the signal output part 23 may further include a buffer amplifier electrically connected between the digital-to-analog converter and the plurality of data lines 101.

Figure 14:
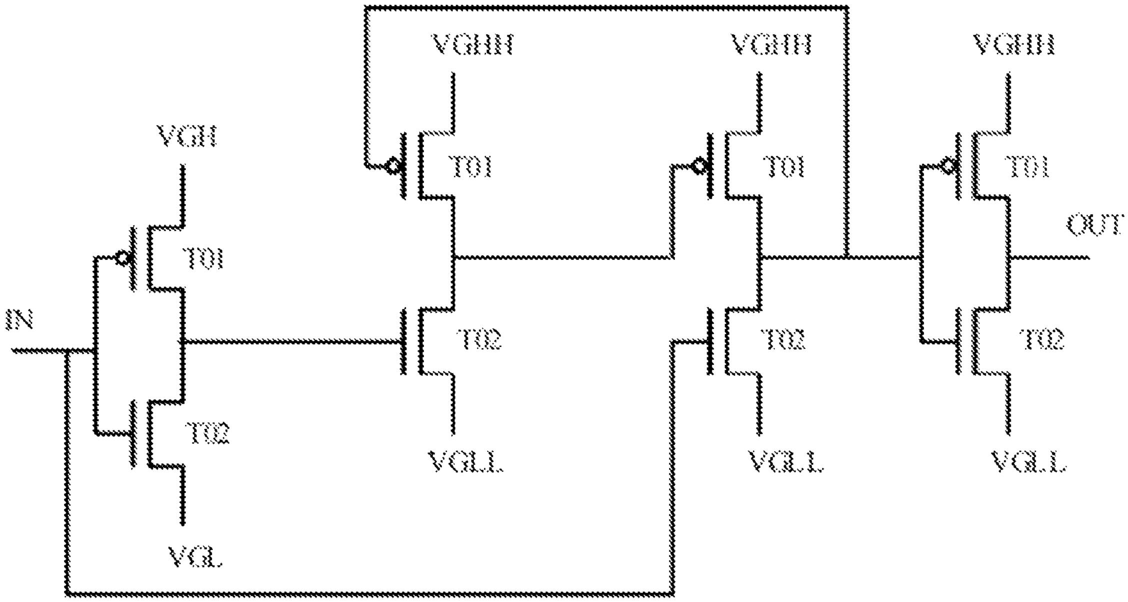
FIG. 14 is a specific circuit configuration of a level shifter according to an embodiment of the present application.

Specifically, the specific circuit structure of the level converter may be illustrated with reference to FIG. 14, in which a transistor T01 may be a P-type transistor, a transistor T02 may be an N-type transistor. A voltage value corresponding to a first high voltage signal VGH may be greater than a voltage value corresponding to the first low voltage signal VGL, and a voltage value corresponding to a second high voltage signal VGHH may be greater than a voltage value corresponding to a second low voltage signal VGLL. An IN terminal of the level converter may be connected to the output terminal of the latch 92, and the level converter converts a corresponding low voltage (a high voltage) into a high voltage (a low voltage) and outputs the high voltage (the low voltage) to the decoder through an OUT terminal.

Figure 15:
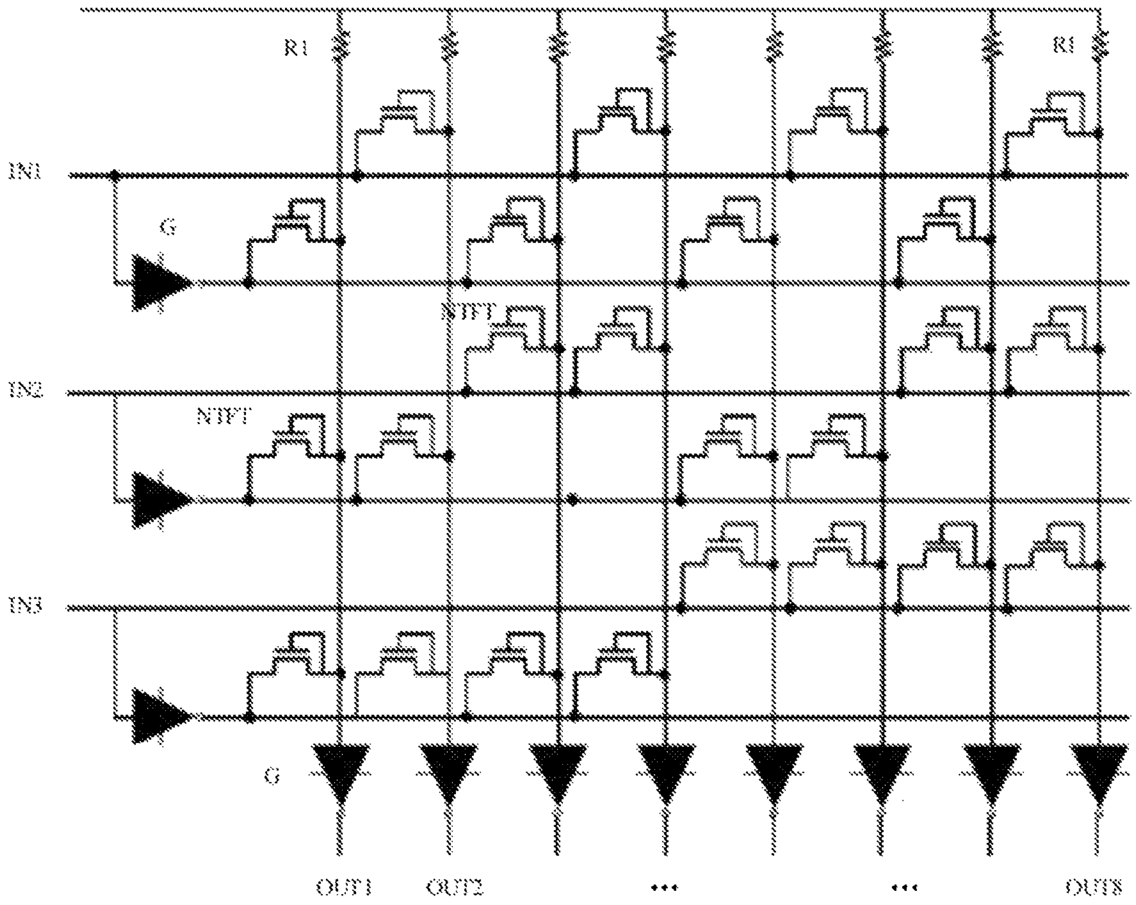
FIG. 15 is a specific circuit configuration of a decoder according to an embodiment of the present application.
Figure 16:
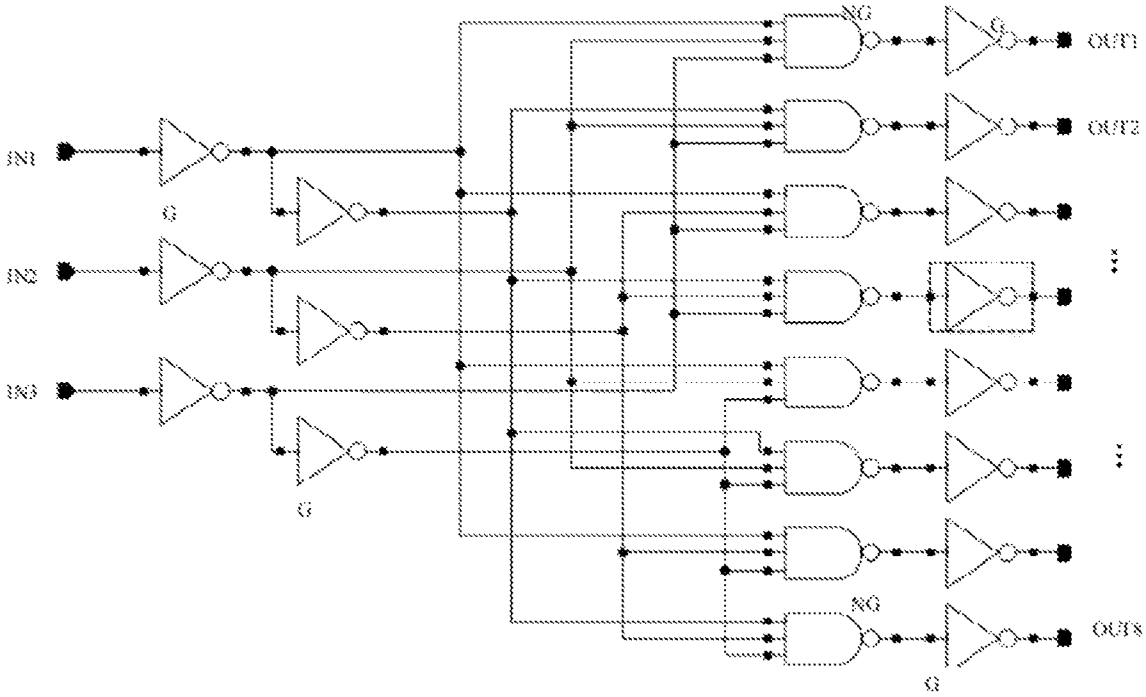
FIG. 16 is a specific circuit configuration of another decoder according to an embodiment of the present application.

Specifically, the specific circuit structure of the decoder may be illustrated with reference to FIG. 15 or 16. FIGS. 15 and 16 may show a 3-8 decoder, where each of three input terminals (IN1 terminal to IN3 terminal) of the 3-8 decoder may be connected to an OUT terminal in a corresponding one of the level converters, eight output terminals (OUT1 terminal to OUT8 terminal) of the 3-8 decoder may be connected to the digital-to-analog converter 93, and the 3-8 decoder may translate the three pieces of respective data corresponding to the three voltages output by the three level converters into eight data. Specifically, FIG. 15 may show a specific circuit structure of the NTFT-diode decoder, which may include a plurality of NAND gates G, a plurality of NTFT, and a plurality of first resistors R1. A gate of the NTFT is short-circuited with a source or a drain of the NTFT to form a diode structure. The NAND gate G may also include the NTFT, where the NTFT is an N-type transistor. FIG. 16 may show a specific circuit structure of the TFT-decoder, which may include a NAND gate G and a NAND gate NG, where the NAND gate G and the NAND gate NG may also include an N-type transistor and a P-type transistor.

Figure 17:
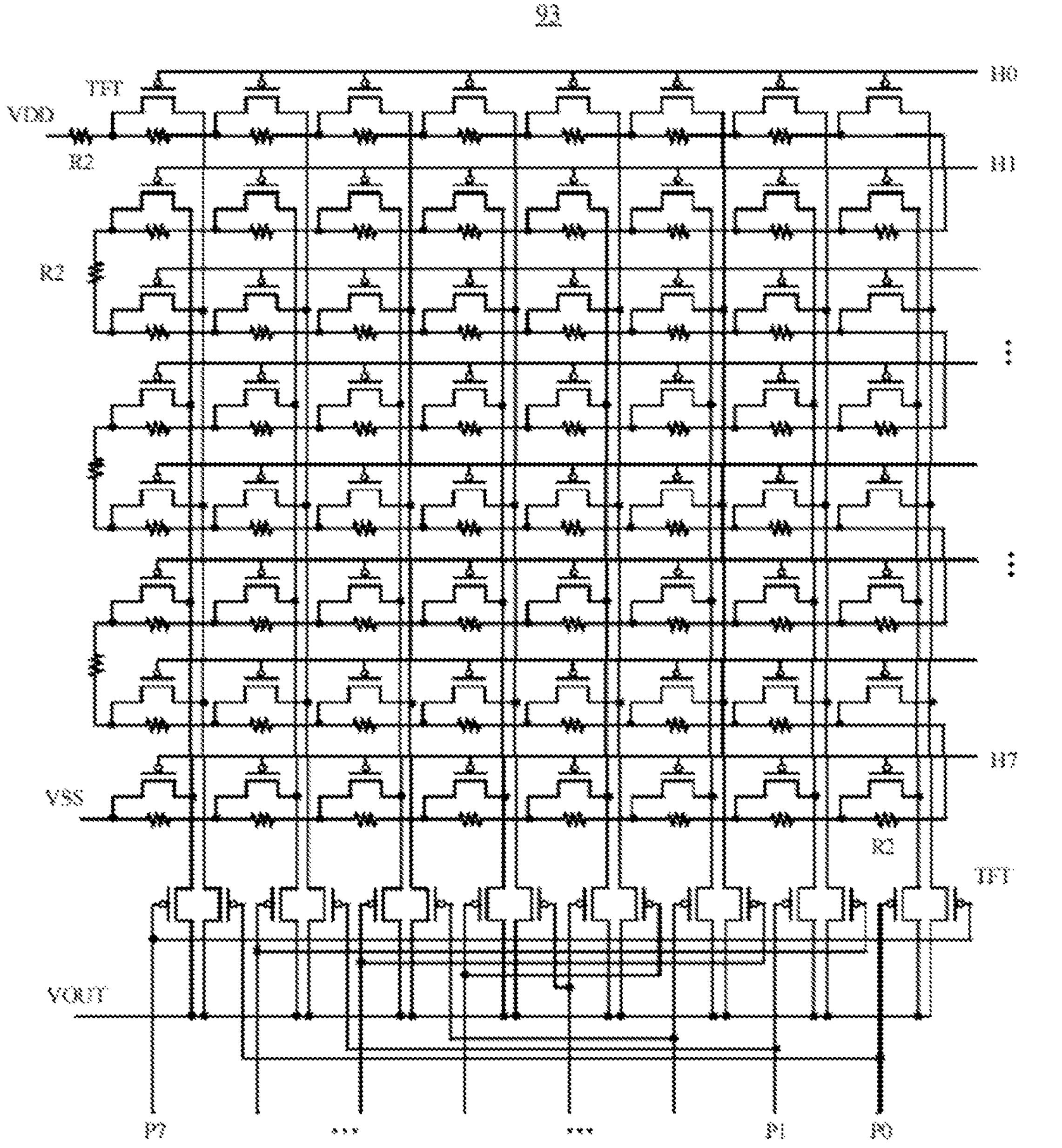
FIG. 17 is a specific circuit configuration of a digital to analog converter according to an embodiment of the present application.

Specifically, the digital-to-analog converter 93 may be illustrated with reference to FIG. 17. The digital-to-analog converter 93 may include a plurality of second resistors R2, a plurality of transistors TFT, which may be P-type transistors, where the third high voltage VDD is greater than the third low voltage VSS. A plurality of input terminals (H0 to H7, P0 to P7) may be connected to a plurality of output terminals of the decoder, respectively, and the VOUT terminal may be connected to the corresponding data line 101 through a buffer amplifier.

In one embodiment, as shown in FIGS. 2, 5, 7, and 9, one of the first module 111 and the second module 112 includes the signal storage module 220, and the other of the first module 111 and the second module 112 includes the signal output module 230. The display panel 100 further includes a semiconductor device electrically connected to the display panel, where the semiconductor device includes the signal generation module 210. Specifically, the chip 300 in FIG. 2 may be the semiconductor device described in the embodiment independent of the insulation substrate 110, and "part module 209" in FIG. 2 may include the signal generation module 210.

It should be understood that the signal generation part 21 including the shift register is a high-frequency module relative to the signal storage part 22 including the latch. The signal generation part 21 is disposed within an individual chip 300 in the present embodiment. For example, the substrate of the chip 300 may be, but is not limited to, a silicon-based or a glass-based substrate, which can satisfy a high-frequency requirement of the signal generation part 21.

Further, as shown in FIG. 1, the signal storage part 22 includes a first transistor device, the signal output part 23 includes a second transistor device, and a third transistor device is disposed in the display region A1 of the insulation substrate 110. The first transistor device, the second transistor device, and the third transistor device are all disposed in the same layer and have the same material. Specifically, in the present embodiment, a module, such as the signal output part 23 and the signal storage part 22, which have a low frequency requirement, is disposed on the insulation substrate 110 in connection with the above description, so that a material, including but not limited to glass, can be used as a substrate, thereby reducing the overall cost and facilitating the layout of the source driving circuit. Further, the first transistor device, the second transistor device, and the third transistor device may be made of the same material and disposed in the same layer in the present embodiment. For example, the active layers of the three devices may be made of the same material and disposed in the same layer, the gate layers of the three devices may be made of the same material and disposed in the same layer, and the source/drain layers of the three devices may be made of the same material and disposed in the same layer, so as to simplify processing and improve efficiency.

Further, as shown in FIGS. 2, 5, 7, and 9, the signal output part 23 includes a resistor which is disposed in the same layer as a portion of the third transistor device and has the same material as that of the third transistor device. Specifically, in connection with the above description, the third transistor device may include a third active layer, a third gate layer, and a third source/drain layer, and the resistive element may be disposed in the same layer and have the same material as at least one of the third active layer, the third gate layer, and the third source drain layer. Further, the resistive element herein may be disposed in the same layer and have the same material as the third active layer. The composition material of the third active layer is not limited herein, and may be, but not limited to, a metal oxide or polysilicon.

In one embodiment, as shown in FIGS. 3, 5, 7, and 9, the signal generation module 210, the signal storage module 220, and the signal output module 230 each include a thin film transistor device disposed on the insulation substrate. Specifically, in connection with the above description, the thin film transistor devices in the signal generation module 210, the signal storage module 220, and the signal output module 230 may all be disposed in the same layer and have the same material as the third transistor device disposed in the display region A1. Specifically, reference may be made to the above related description of the processes and materials of the first transistor device, the second transistor device, and the third transistor device.

Another embodiment of the present application provides an electronic terminal comprising the display panel according to any one of the foregoing.

The display panel and the electronic terminal provided in the embodiments of the present application include: the insulation substrate; the plurality of data lines disposed on the insulation substrate; and the source driving circuit electrically connected to the plurality of data lines and including both the first module and the second module disposed on the insulation substrate; wherein the source driving circuit further includes the strobe module disposed on the insulation substrate and connected between the plurality of output pins of the first module and the plurality of input pins of the second module, the number of the output pins of the first module is different from the number of the input pins of the second module, and the strobe module is configured to control the output pins of the first module to be electrically connected to different input pins of the second module at different moments. On the one hand, at least the first module and the second module in the source driving circuit of the present application are disposed on the insulation substrate to reduce the size of the carrier module or the device including but not limited to the chip. On the other hand, the strode module in the present application is connected between the first module and the second module to control the output pins of the first module to be electrically connected to different input pins of the second module at different moments, so that the number of the output pins of the first module is different from the number of the input pins of the second module, so as to reduce the size of at least one of the first module and the second module. Both of foregoing can reduce the cost of the display panel.

The display panel and the electronic terminal provided in the embodiments of the present application are described in detail above. In this specification, principles and implementations of the present application are illustrated by applying specific examples herein. The description of the above embodiments is only used to help understand the technical solutions and core ideas of the present application; those of ordinary skill in the art should understand that it is still possible to modify the technical solutions recorded in the foregoing embodiments, and these modifications or replacements do not cause the essence of the corresponding technical solutions to deviate from the scope of the technical solutions of the embodiments of the present application.

What is claimed is:

1. A display panel, comprising:
an insulation substrate;
a plurality of data lines disposed on the insulation substrate; and
a source driving circuit electrically connected to the plurality of data lines and comprising both a first module and a second module disposed on the insulation substrate;

wherein the source driving circuit further comprises a strobe module disposed on the insulation substrate and connected between a plurality of output pins of the first module and a plurality of input pins of the second module, the number of the output pins of the first module is different from the number of the input pins of the second module, and the strobe module is configured to control the output pins of the first module to be electrically connected to different input pins of the second module at different moments;

the display panel comprises a signal generation module, a signal storage module, and a signal output module, wherein the signal storage module is connected between the signal generation module and the signal output module;

wherein the first module comprises one of the signal generation module, the signal storage module, and the signal output module, and the second module comprises another of the signal generation module, the signal storage module, and the signal output module that is different from the one of the signal generation module, the signal storage module, and the signal output module;

the strobe module comprises a plurality of input terminals connected to respective output pins of the first module, a plurality of output terminals connected to respective input pins of the second module, and a plurality of control terminals for loading control signals to enable the input terminals to be electrically connected to different output terminals at different moments, wherein the number of the input terminals is different from the number of the output terminals.

2. The display panel of claim 1, wherein the signal generation module, the signal storage module, and the signal output module each comprise a thin film transistor disposed on the insulation substrate.

3. The display panel of claim 1, wherein one of the first module and the second module comprises the signal storage module, and the other of the first module and the second module comprises the signal output module;

wherein the display panel further comprises a semiconductor device electrically connected to the display panel, and the semiconductor device comprises the signal generation module.

4. The display panel of claim 1, wherein the first module comprises a signal generation module, and the second module comprises a signal storage module, the signal generation module and the signal storage module being connected in series with the strobe module;

wherein the input terminals are connected to output pins of the signal generation module, the plurality of output terminals of the strobe module comprise a first output terminal and a second output terminal, the first output terminal is connected to corresponding first input pin of the signal storage module, and the second output terminal is connected to corresponding second input pin of the signal storage module;

wherein the signal storage module is configured to store first data generated by the signal generation module in a first time period and second data generated by the signal generation module in a second time period.

5. A display panel, comprising:

an insulation substrate;

a plurality of data lines disposed on the insulation substrate; and a source driving circuit electrically connected to the plurality of data lines and comprising both a first module and a second module disposed on the insulation substrate;

wherein the source driving circuit further comprises a strobe module disposed on the insulation substrate and connected between a plurality of output pins of the first module and a plurality of input pins of the second module, the number of the output pins of the first module is different from the number of the input pins of the second module, and the strobe module is configured to control the output pins of the first module to be electrically connected to different input pins of the second module at different moments;

wherein the display panel further comprises a signal generation module, a signal storage module, and a signal output module, and the signal storage module is connected between the signal generation module and the signal output module;

wherein the first module comprises one of the signal generation module, the signal storage module, and the signal output module, and the second module comprises another of the signal generation module, the signal storage module, and the signal output module that is different from the one of the signal generation module, the signal storage module, and the signal output module; and wherein the strobe module comprises a plurality of control terminals for loading control signals to enable control of the output pins of the first module to be electrically connected to different input pins of the second module at different moments.

6. The display panel of claim 5, wherein the signal generation module, the signal storage module, and the signal output module each comprise a thin film transistor disposed on the insulation substrate.

7. The display panel of claim 5, wherein one of the first module and the second module comprises the signal storage module, and the other of the first module and the second module comprises the signal output module;

wherein the display panel further comprises a semiconductor device electrically connected to the display panel, and the semiconductor device comprises the signal generation module.

8. The display panel of claim 5, wherein the strobe module comprises a plurality of input terminals connected to respective output pins of the first module, a plurality of output terminals connected to respective input pins of the second module, and, wherein the number of the input terminals is different from the number of the output terminals.

9. The display panel of claim 8, wherein the first module comprises a signal generation module, and the second module comprises a signal storage module, the signal generation module and the signal storage module being connected in series with the strobe module;

wherein the input terminals are connected to output pins of the signal generation module, the plurality of output terminals of the strobe module comprise a first output terminal and a second output terminal, the first output terminal is connected to corresponding first input pin of the signal storage module, and the second output terminal is connected to corresponding second input pin of the signal storage module;

wherein the signal storage module is configured to store first data generated by the signal generation module in a first time period and second data generated by the signal generation module in a second time period.

10. The display panel of claim 9, wherein the source driving circuit further comprises a signal output module electrically connected between the signal storage module and the plurality of data lines;

wherein, at the same time, the signal storage module is configured to transmit the first data and the second data to the signal output module.

11. The display panel of claim 9, wherein the strobe module comprises a plurality of first transistors and a plurality of second transistors;

wherein a source of the first transistor and a source of the second transistor are both configured as the respective input terminals, a gate of the first transistor and a gate of the second transistor are both configured as the respective control terminals, a drain of the first transistor is configured as the corresponding first output terminal, and a drain of the second transistor is configured as the corresponding second output terminal.

12. The display panel of claim 8, wherein the first module comprises a signal storage module, and the second module comprises a signal output module connected between the signal storage module and the plurality of data lines;

wherein the plurality of input terminals of the strode module comprise a first input terminal and a second input terminal, the plurality of output terminals of the strode module comprise a first output terminal and a second output terminal, the first input terminal is connected to a first output pin of the signal storage module, the second input terminal is connected to a second output pin of the signal storage module, the first output terminal is connected to the corresponding first input pin of the signal output module, and the second output terminal is connected to the corresponding second input pin of the signal output module.

13. The display panel of claim 12, wherein the source driving circuit further comprises a signal generation module electrically connected to the signal storage module;

wherein, at the same time, the plurality of signal generation modules are configured to generate first data and second data, and a first input pin of the signal output module is configured to receive the corresponding first data, while a second input pin of the signal output module is configured to receive the corresponding second data.

14. The display panel of claim 12, wherein the strode module comprises a first transistor, a second transistor, a third transistor, and a fourth transistor;

wherein a source of the first transistor and a source of the second transistor are both configured as the first input terminals, a source of the third transistor and a source of the fourth transistor are both configured as the corresponding second input terminals, a gate of the first transistor, a gate of the second transistor, a gate of the third transistor, and a gate of the fourth transistor are all configured as the respective control terminals, a drain of the first transistor and a drain of the third transistor are both configured as the corresponding first output terminals, and a drain of the second transistor and a drain of the fourth transistor are both configured as the corresponding second output terminals.

15. The display panel of claim 8, wherein the first module includes a signal output module, the second module includes a signal storage module, and the plurality of data lines includes a plurality of first data lines, a plurality of second data lines, and a plurality of third data lines;

wherein the strode module comprises a first strode module connected between the first module and the second module, and a second strode module connected between the first module and the plurality of data lines;

wherein the plurality of input terminals of the first strode module comprise a first input terminal, a second input terminal and a third input terminal, the plurality of output terminals of the first strode module comprise a first output terminal, the first input terminal is connected to a first output pin of the signal storage module, the second input terminal is connected to a second output pin of the signal storage module, the third input terminal is connected to a third output pin of the signal storage module, and the first output terminal is connected to the corresponding input pin of the signal output module; and wherein the plurality of input terminals of the second strode module comprise a fourth input terminal, the plurality of output terminals of the second strode module comprise a second output terminal, a third output terminal and a fourth output terminal, the fourth input terminal is connected to the corresponding output pin of the signal output module, the second output terminal is connected to the corresponding first data line, the third output terminal is connected to the corresponding second data line, and the fourth output terminal is connected to the corresponding third data line.

16. The display panel of claim 15, wherein the source driving circuit further comprises a signal generation module electrically connected to the signal storage module;

wherein the signal output module is configured to transmit the first data output from the first output pin of the signal generation module to the corresponding first data line, transmit the second data output from the second output pin of the signal generation module to the corresponding second data line, and transmit the third data output from the third output pin of the signal generation module to the corresponding third data line.

17. The display panel of claim 15, wherein the first strode module comprises a first transistor, a second transistor, and a third transistor;

wherein a source of the first transistor is configured as the first input terminal, a drain of the second transistor is configured as the second input terminal, a drain of the third transistor is configured as the corresponding third input terminal, a gate of the first transistor, a gate of the second transistor, and a gate of the third transistor are all configured as the respective control terminals, and a drain of the first transistor, a drain of the second transistor, and a drain of the third transistor are all configured as the corresponding first output terminals.

18. The display panel of claim 15, wherein the second strode module comprises a fourth transistor, a fifth transistor, and a sixth transistor;

wherein a source of the fourth transistor, a source of the fifth transistor, and a source of the sixth transistor are all configured as the fourth input terminals, a gate of the fourth transistor, a gate of the fifth transistor, and a gate of the sixth transistor are all configured as the respective control terminals, a drain of the fourth transistor is configured as the second output terminal, a drain of the fifth transistor is configured as the corresponding third output terminal, and a drain of the sixth transistor is configured as the corresponding fourth output terminal.

19. An electronic terminal, comprising the display module of claim 5.

* * * * *